United States Patent [19] [11] Patent Number: 4,570,417
Herr [45] Date of Patent: Feb. 18, 1986

[54] PROCESS FOR LOADING A SHIPPING CONTAINER WITH VEHICLES

[75] Inventor: Friedhelm Herr, Heddesheim, Fed. Rep. of Germany

[73] Assignee: Deere & Company, Moline, Ill.

[21] Appl. No.: 614,345

[22] Filed: May 25, 1984

[30] Foreign Application Priority Data

Jun. 4, 1983 [DE] Fed. Rep. of Germany ....... 3320332

[51] Int. Cl.⁴ .............................................. B65B 5/00
[52] U.S. Cl. ....................................... 53/428; 53/473; 180/7.1; 180/209; 206/335
[58] Field of Search ......................... 53/428, 467, 473; 206/335; 217/37, 38; 410/3, 4, 7, 9, 19, 43; 180/208, 209, 7.1

[56] References Cited

U.S. PATENT DOCUMENTS

| | | | |
|---|---|---|---|
| 1,661,459 | 3/1928 | Baus | 410/43 |
| 1,750,128 | 3/1930 | Romine | 410/43 |
| 3,606,944 | 9/1971 | Cadillac | 206/335 |
| 3,888,189 | 6/1975 | Bass | 410/4 |
| 4,171,741 | 10/1979 | Fish | 206/335 |

Primary Examiner—John Sipos

[57] ABSTRACT

To load several self-propelled vehicles in a container with optimum utilization of the available volume in the container, the front axle and wheels are replaced by a smaller auxiliary wheel which is attached to the front end of the vehicle. The rear wheels are replaced by smaller auxiliary wheels. The resulting reduction in vehicle height and front end width makes it possible to locate more vehicles than previously possible into an open top, shipping container. The vehicles as modified for shipping are still driveable and steerable and thus, may be loaded and unloaded from the container by driving the vehicle under its own power.

2 Claims, 4 Drawing Figures

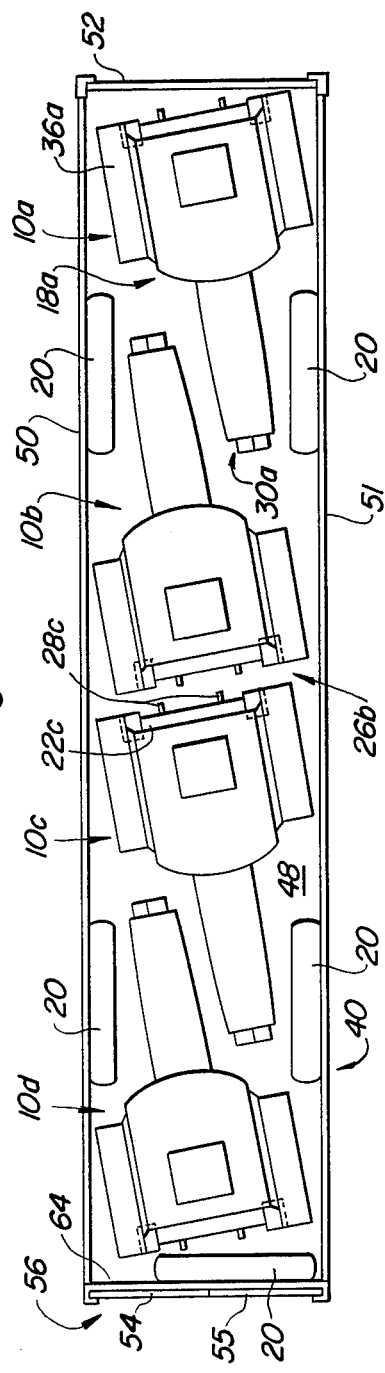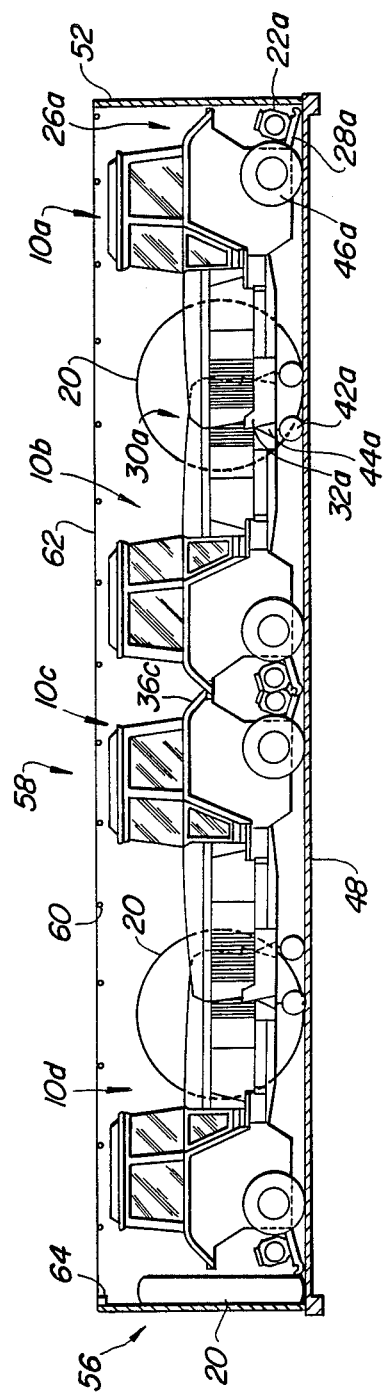

4,570,417

PROCESS FOR LOADING A SHIPPING CONTAINER WITH VEHICLES

BACKGROUND OF THE INVENTION

This invention relates to a process for loading a shipping container with at least one wheeled vehicle for shipping by highway, rail and/or water transportation.

In one prior art process, ready-to-drive vehicles such as tractors are driven for shipping into a container such as a ship's cargo hold, the loading area of a truck, etc., by means of the standard vehicle drive. These vehicles are shipped in normal operating condition and can be unloaded at the shipping destination efficiently and conveniently by normal operation of the vehicle drive.

However, this process is suitable only for shipping relatively low vehicles such as tractors without a driver's cab or roll bar. If the vehicle does have a driver's cab or roll bar, the structures may be dismantled and shipped separately. Dismantling of the driver's cab requires dismantling of operating components of the engine and transmission of the tractor and, thus, the tractor cannot be driven into the container by means of its own drive system. Furthermore, because of the larger external dimensions of tractors with an engine power of 70 kilowatts or more, such tractors are too high for a standard container even without any superstructure. The use of larger containers which could hold such vehicles would increase shipping costs. Higher shipping costs would be due to the increased amount of unusable space between vehicles in the container.

SUMMARY OF THE INVENTION

Accordingly, it is an object of this invention to provide an optimized process for loading a shipping container with self-propelled vehicles so that as many vehicles as possible can be shipped in the container with as little unused space as possible.

These and other objects of the invention are accomplished in a process for shipping a self-propelled vehicle having a height greater than the height of the container by replacing the operating wheels of the vehicle with auxiliary wheels. The auxiliary wheels are chosen to have a diameter such that the height of the vehicle is reduced to a level which allows the vehicle to be driven into the container. In this way, the height of the vehicle, which is the crucial factor in driving it into the container, is reduced to a minimum and the vehicle remains driveable. The diameter of the auxiliary wheels are selected such that it is unnecessary to remove components such as the driver's cab which substantially increase the height of the vehicle. In addition, all components necessary for the self-propelled operation of the vehicle remain assembled and on the vehicle. The compact design of the vehicle then yields a greater utilization of the available volume in the container. In addition, the advantage of simple and rapid unloading is maintained.

Rapid loading and unloading of the container with self-propelled vehicles is achieved when at least one of the auxiliary wheels can be driven by a drive which is standard equipment on the vehicle. In this way, it is possible to drive the vehicle into the container without any additional means for moving the vehicle for loading. Also, there is no additional expense because the drive is standard equipment on the vehicle. Shipping of vehicles which have a rear drive axle then proves to be a simple and rapid procedure. It requires only that the standard rear drive wheels be replaced with auxiliary wheels.

To ship vehicles having a front axle, the front axle is removed and replaced with at least one auxiliary wheel rotatable about a horizontal axis ("horizontally rotatable"). The auxiliary wheel does not interfere with the steering of the vehicle. Because the standard equipment front axle normally determines the width of the vehicle at the front end, removal of the front axle results in a significant reduction in the space required to ship the vehicle. At the same time, the vehicle is still driveable. Thus, to load a container with self-propelled vehicles which have a T-shape in plan view and have single-wheel brakes on the rear drive wheels, problem-free conversion to the ready-to-ship state and optimum alignment of the vehicles in the container are achieved by bolting the horizontally rotatable, auxiliary wheel to the front of the vehicle and steering the vehicle by operating the single-wheel brakes.

If the vehicles are tractors with an operator's cab, a rear hitch and removable base weights on the front, then the best utilization of the components is (1) to remove the front wheels from the front axle which has been removed from the vehicle and attach the front axle to the rear hitch and (2) to remove the base weights from the front of the tractor and attach the auxiliary wheel (for example, by bolting) to the support for the base weights. A further reduction in the space requirements is achieved by simultaneously using the standard equipment front wheels as auxiliary wheels for the rear drive axle. The tractor is, thus, converted to a ready-to-ship state by using only components (except for the front auxiliary wheel) that are standard equipment on the tractor.

According to another feature of the invention, if the dimensions of the tractor and container are suitable, the tractors are oriented in the container such that the front ends of at least two tractors are positioned side-by-side. Tractors positioned in this manner can be driven toward each other until the front ends of the facing tractors are nearly in contact. By overlapping the tractors in this manner, the total length for each pair of facing tractors is short.

A further step for optimizing this shipping method is to place components removed from the tractor in free space adjacent the tractors in the container. Preferably, the tractors are loaded in pairs with the front ends overlapping and facing each other, and space remains adjacent the front ends of each pair of facing tractors. By using this unfilled space for shipping the detached components, an improved cost-to-volume ratio and cost-to-weight ratio are achieved.

BRIEF DESCRIPTION OF THE DRAWINGS

FIG. 3 shows a plan view of several of the tractors shown in FIG. 1 which have been prepared for shipping and arranged in a shipping container in accordance with the method of this invention. The tractors are shown in an open container in a ready-to-ship condition.

FIG. 4 shows a side elevational view of FIG. 3 with a sidewall of the container removed to expose the tractors loaded therein.

DESCRIPTION OF THE PREFERRED EMBODIMENT

Figure 1:
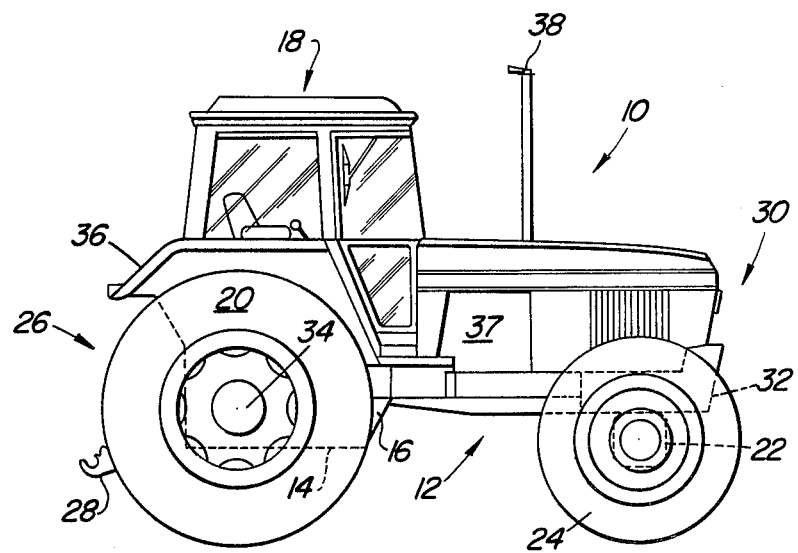
FIG. 1 shows a side elevational view of a tractor which is illustrative of the type of vehicle which is suitable for shipping in accordance with a preferred embodiment of a process of this invention.

FIG. 1 illustrates a conventional tractor 10 which is suitable for shipping in accordance with a preferred embodiment of a process of this invention. Tractor 10 is comprised of a chassis 12 with a lower edge 14 formed by a transmission housing 16, a driver's cab 18, rear wheels 20 (only one shown) with rubber tires and two steerable front wheels 24 (only one shown) with rubber tires. The front wheels 23 are mounted on a front axle 22 and are adjusted to the same wheel base as rear wheels 20. Rear wheels 20 are driven by a transmission (not shown) in transmission housing 16 which is controlled from cab 18. Tractor 10 has a hitch 28 at its rear end 26 and a front axle block 32 at its front end 30. A base weight (not shown) is attachable to front axle block 32 by bolting. Rear wheels 20 are mounted on a rear axle shaft 34 and are partially covered by fenders 36. A combustion engine 37 drives the transmission (not shown). An easily removable exhaust pipe 38 is attached to an exhaust connection (not shown) of engine 37.

Figure 2:
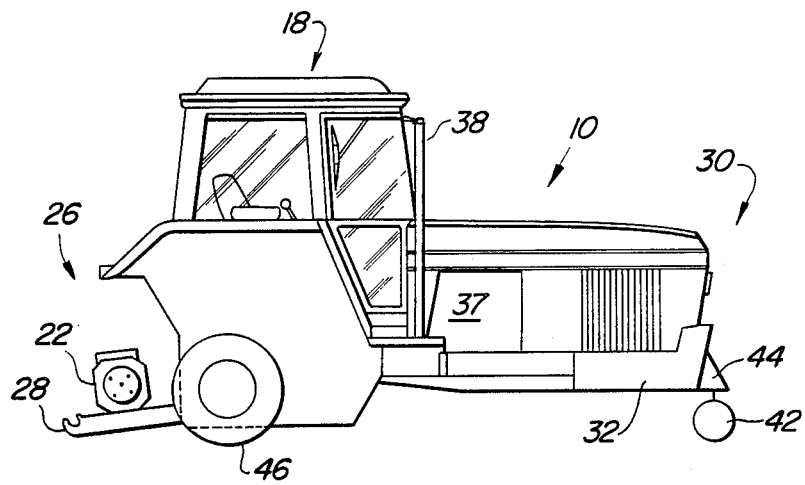
FIG. 2 shows the tractor of FIG. 1 in a ready-to-ship state.

Tractor 10 has a length of about 4.2 meters between the front edge of front wheels 24 and the rear end of hitch 28 in a lowered position. The width measured at the outside edges of rear fenders 36 is about 2.05 meters. The height of the uppermost surface of rear tires 20 to the upper edge of cab 18 is about 2.84 meters and to the upper edge of the exhaust pipe 38 is about 3.04 meters. These dimensions are based on a tractor with an engine power of 71 kilowatts and a 6 cylinder combustion engine. To ship as many as possible of tractors 10 in a standardized shipping container 40 as shown in FIGS. 3, 4, each tractor 10 is converted to a "ready-to-ship" condition as illustrated in FIG. 2. Standardized container 40 is commonly referred to as a 40 foot (12.19 meters) open top container and has an inside width of 2.33 meters, an inside height of 2.37 meters and an inside length of 12.01 meters. Container 40 includes a bottom 48, sidewalls 50, 51, a rear wall 52, a front wall 56 and an open roof 58. Front wall 56 consists of two hinged doors 54, 55 which may be opened to receive cargo. Roof 58 consists of cross beams 60 and a tarpaulin 62 placed over cross beam 60 for protection against water, snow and dirt. A beam 64 is placed across doors 54, 55 and is removed during loading and unloading of container 40 to increase the size of the opening formed by opening doors 54, 55. The opening is normally defined by the upper edge of bottom 48, sidewalls 50, 51 and the lower edge of beam 64. Container 40 is suitable for shipping by highway, rail or water transportation. On ships, such containers 40 can be stacked one on top of the other.

Tractor 10 illustrated in FIG. 2 in the ready-to-ship condition differs from the completely finished ready-for-use tractor shown in FIG. 1 in the following ways. First, front axle 22 and front wheels 24 are removed and are replaced by a front auxiliary or supporting wheel 42 rotatable about a horizontal axis. Wheel 42 is connected to front axle case 32 by a frame 44. Secondly, rear wheels 20 are replaced by auxiliary wheels 46 made of steel or cast iron. Wheels 46 have a considerably smaller outside diameter than standard equipment wheels 20. Following replacement of these components, tractor 10 is still driveable and steerable as will be explained in more detail below. The dimensions of front wheel 42, frame 44 and auxiliary wheel 46 are chosen such that (1) tractor 10 is in an approximately horizontal position when located in container 40 and (2) the tractor height is reduced to an extent that it is less than the height of the opening into container 40 via doors 54, 55. Tractor 10 must be maintained in an approximately horizontal position so that the lubricant in engine 37 and the transmission (not shown) still cover the intake ports of oil pumps (not shown) installed therein. If the oil pumps are exposed from the lubricant, the functioning of these components would be jeopardized. When tractor 10 is ready for shipping, a free space still remains of about 1–2 centimeters between the bottom edge 14 of transmission housing 16 and the contact surface of tires 46. The free space prevents damage to transmission housing 16 as a result of engagement with beams, bars or other objects which might project above the bottom 48. Lastly, front axle 22 is disassembled from front wheels 24 and is attached to hitch 28 transverse to the longitudinal axis of tractor 10.

In order to convert tractor 10 from the ready-to-operate condition shown in FIG. 1 to the ready-to-ship condition shown in FIG. 2, the following steps are necessary:

Tractor 10 is raised at the front end 30 by a crane or some other hoisting device.

Front wheels 24 are removed.

Front axle 22 is disassembled from front axle block 32, e.g., by loosening a bolt (not shown) which connects axle 22 with front axle block 32.

Frame 44 with support wheel 42 thereon is attached to front axle block 32, e.g., by bolting. Such bolts may be connected to block 32 in holes already provided therein for attaching base weights (not shown) to the front of tractor 10.

Tractor 10 is then lowered until the front end 30 is supported on wheel 42. Rear end 26 of tractor 10 is then raised by a crane or some other hoisting device.

Rear wheels 20 are removed. Auxiliary wheels 46 are placed on and attached to rear axle shaft 34.

Rear end 26 of tractor 10 is then lowered until it is supported by auxiliary wheels 46. Front axle 22 is then placed on hitch 28 transverse to the longitudinal axis of tractor 10 and secured firmly thereto.

Exhaust pipe 38 is removed and attached to chassis 12 in any suitable way.

Of course, front end 30 and rear end 26 of tractor 10 can be raised simultaneously or rear end 26 can be raised first and then front end 30 can be raised.

In the ready-to-ship condition, tractor 10 has a T-shape (in plan view) formed by chassis 12 and rear end 26. The front end width corresponds only to the width of chassis 12 which is significantly less than the width of the total tractor 10 in the ready-to-operate condition with front axle 22 and front wheels 24 thereon. No changes are made in the operating and drive components of tractor 10. Thus, tractor 10 is still driveable and can be driven into or out of container 40 by its own power. After removal of steerable front wheels 24 and axle 22, tractor 10 is still steerable by means of standard equipment first and second single-wheel brakes (not shown) which act respectively on each rear wheel 20 in the ready-to-use state or on auxiliary wheels 46 in the ready to ship condition. (The brakes do not act directly on rear wheels 20 or wheels 46, but on rear axle shaft 34.) The brakes are operated to provide skid steering of the tractor 10. Container 40 is unloaded by reversing the order of the preceding description.

The T-shape of tractor 10 in the ready-to-ship condition makes it possible to accommodate several tractors 10 in a staggered array in container 40 as shown in FIG. 3 and to utilize efficiently the available volume in container 40. Nevertheless, the spaces remaining between individual tractors 10 can be filled with front and/or rear wheels 20, 24 to the extent possible. Any front or rear wheels 24, 20 which cannot be fitted into the container 40 may be shipped in a suitable smaller container.

If possible, based on the given dimensions and carrying capacity of front wheels 24, wheels 24 may be attached to rear axle shaft 34 instead of auxiliary wheels 46 made of steel or cast iron. Front wheels 24 may be attached to rear axle 34 by suitable adapters if necessary. The use of wheels 24 instead of auxiliary wheels 46 provide additional space in container 40 for shipping other components that have been disassembled from tractor 10. In addition, the elimination of auxiliary wheels 46 would provide an additional reduction in shipping costs.

The process of this invention is not limited to use only with tractors. It may be used with any vehicle which can be converted to a suitable external shape by removing components that are not absolutely necessary for driving of the vehicle by its own power or by replacing such drive components with other components having the same or similar function and smaller dimensions. By these techniques, it is still possible to drive such vehicles into a container and arrange them in a suitable staggered array which achieves an optimum utilization of the available volume. Examples include self-propelled harvesters, small combines, self-propelled mowers, road graders, etc.

FIGS. 3 and 4 show how four tractors 10a, 10b, 10c, 10d of the type shown in FIG. 1 (with the dimensions given above and prepared in a ready-to-ship condition as shown in FIG. 2) can be located in open top container 40 in the most advantageous manner. To load container 40, the first tractor 10a is driven in backwards up to rear wall 52. Just before hitting rear wall 52, tractor 10a is turned to the left by operating the right single-wheel brake such that the longitudinal axis of tractor 10 is slanted toward sidewall 51. One rear wheel 20 is fitted between front end 30a and sidewall 51. A second rear wheel 20 is placed along the opposite sidewall 50 near driver's cab 18a. Then, a second tractor 10b is driven forwardly into container 40 and turned slightly to the right until the front ends of the first and second tractor 10a, 10b are side-by-side and front end 30b of tractor 10b nearly reaches the right rear fender 36a of the first tractor 10a. Third and fourth tractors 10c, 10d are driven into container 40 in the same manner as the first and second tractors 10a, 10b. The rear end 26b of the second tractor 10b is regarded as a rear wall against which the third tractor 10c is positioned adjacent thereto. Finally, a rear wheel 20 is stored between the rear end 26d of the fourth tractor 10d and hinged doors 54, 55.

Statements regarding the right and left are determined from a line of sight from the rear wall 52 to front wall 56.

The invention herein has been explained in connection with a preferred embodiment thereof. However, other variations and modifications of the preferred embodiment will be apparent to those skilled in the art. For example, the process may be practiced with containers and tractors with dimensions other than those given above. As an example, two tractors may be loaded into a smaller container such as a 20 foot container (6.05 meters). In addition, the tractors need not be staggered toward each other in container 40, but may be positioned with their front ends in a mutually opposed relationship. In this case, the free space on each side of chassis 12 can be filled with the front or rear wheels. Still another variation of the process which may be used to reduce the cost is to remove the front auxiliary wheel from the tractor after it has been driven into the shipping container and to use the removed front auxiliary wheel as the front auxiliary wheel for the next tractor to be loaded into the container. Other such variations will be apparent to those skilled in the art. Accordingly, it is intended that all such variations and modifications, which are within the true spirit and scope of applicant's invention, be comprehended within the scope of the appended claims.

I claim:

1. A process for loading a shipping container with at least two tractors which each include a rear portion supported by a pair of transversely spaced rear drive wheels having brakes, a narrow forward portion joined to the rear portion, a transverse front axle assembly connected to the forward end of and extending laterally beyond opposite sides of the narrow forward portion, a pair of front support wheels connected to the opposite ends of the front axle, and a drive means in said tractor for driving said drive wheels, and each tractor having a height greater than the height of the container and a width slightly narrower than the width of the container, comprising the steps of: (a) replacing the pair of rear drive wheels of each tractor with a pair of auxiliary wheels; (b) removing the front support wheels from the front axle of each tractor and the front axle from the forward portion of each tractor; (c) fixedly mounting a frame to the forward end of the forward portion and fixedly mounting a single front auxiliary wheel to said frame at the forward end of the forward portion of each tractor, with the diameters of the auxiliary wheels being such that the tractor has a height less than that of the container; (d) driving a first of the tractors under its own power in reverse into one end of the container and steering the tractor by operating said brakes such that as it approaches a rear wall of the container, the tractor is caused to assume a position wherein its longitudinal axis is slanted relative to a longitudinal axis of the container; (e) driving a second of the tractors under its own power forwardly into the container and steering by its brakes so that the forward portion thereof overlaps and is substantially parallel to a considerable length of the forward portion of the first tractor.

2. The process of claim 1 further comprising the step of: connecting said axle to a rear hitch of said vehicle.

* * * * *